US012654101B2

(12) United States Patent
Zhang

(10) Patent No.: US 12,654,101 B2
(45) Date of Patent: Jun. 16, 2026

(54) TARGET LOCKING METHOD AND APPARATUS, ELECTRONIC DEVICE, AND STORAGE MEDIUM

(71) Applicant: NETEASE (HANGZHOU) NETWORK CO., LTD., Hangzhou (CN)

(72) Inventor: Zequan Zhang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 330 days.

(21) Appl. No.: 18/280,992

(22) PCT Filed: Jun. 23, 2022

(86) PCT No.: PCT/CN2022/100794
§ 371 (c)(1),
(2) Date: Sep. 8, 2023

(87) PCT Pub. No.: WO2023/142354
PCT Pub. Date: Aug. 3, 2023

(65) Prior Publication Data
US 2024/0173621 A1 May 30, 2024

(30) Foreign Application Priority Data
Jan. 25, 2022 (CN) ......................... 202210088750.3

(51) Int. Cl.
*A63F 13/537* (2014.01)
*A63F 13/2145* (2014.01)
(Continued)

(52) U.S. Cl.
CPC ........ *A63F 13/537* (2014.09); *A63F 13/2145* (2014.09); *A63F 13/52* (2014.09);
(Continued)

(58) Field of Classification Search
CPC ................ A63F 13/537; A63F 13/2145; A63F 13/5372; A63F 13/822; A63F 13/52; A63F 13/533
See application file for complete search history.

(56) References Cited

U.S. PATENT DOCUMENTS 6,273,818 B1 * 8/2001 Komoto ................ A63F 13/833
463/31
6,409,604 B1 * 6/2002 Matsuno ............... A63F 13/833
463/31

(Continued)

FOREIGN PATENT DOCUMENTS

CN        107837529 A      3/2018
CN        109865286 A      6/2019
(Continued)

OTHER PUBLICATIONS

Pillars of Eternity. Wikipedia.org. Online. Oct. 19, 2021. Accessed via the Internet. Accessed Oct. 17, 2025. <URL: https://en.wikipedia.org/w/index.php?title=Pillars_of_Eternity&oldid=1050650671> (Year: 2021).*

(Continued)

*Primary Examiner* — Carl V Larsen
(74) *Attorney, Agent, or Firm* — BCF LLP

(57) ABSTRACT

A target locking method and apparatus, an electronic device, and a storage medium are provided. The target locking method includes: determining an anchor point position on a graphical user interface on which a plurality of virtual objects are displayed, determining a plurality of target virtual objects corresponding to a target skill from the plurality of virtual objects, according to a relative position of each virtual object to the anchor point position and the target skill, and displaying a locking mark on the target virtual objects.

16 Claims, 4 Drawing Sheets

(51) Int. Cl.

| | |
|---|---|
| *A63F 13/52* | (2014.01) |
| *A63F 13/533* | (2014.01) |
| *A63F 13/5372* | (2014.01) |
| *A63F 13/822* | (2014.01) |

(52) U.S. Cl.
CPC ........ *A63F 13/533* (2014.09); *A63F 13/5372* (2014.09); *A63F 13/822* (2014.09)

(56) References Cited

U.S. PATENT DOCUMENTS

| | | | | |
|---|---|---|---|---|
| 8,210,943 | B1 * | 7/2012 | Woodard | A63F 13/69 |
| | | | | 463/2 |
| 10,350,487 | B2 * | 7/2019 | Seok | A63F 13/822 |
| 11,090,563 | B2 * | 8/2021 | Wu | A63F 13/537 |
| 12,064,693 | B2 * | 8/2024 | Wan | A63F 13/56 |
| 2007/0060342 | A1 * | 3/2007 | Sakaguchi | A63F 13/822 |
| | | | | 463/31 |
| 2016/0067601 | A1 * | 3/2016 | Mehra | A63F 13/798 |
| | | | | 463/11 |
| 2018/0001189 | A1 | 1/2018 | Tang et al. | |
| 2019/0034759 | A1 * | 1/2019 | Barnett | G06V 20/20 |
| 2019/0366213 | A1 * | 12/2019 | Zhou | A63F 13/533 |
| 2022/0035515 | A1 * | 2/2022 | Wan | A63F 13/5372 |
| 2023/0030619 | A1 * | 2/2023 | Qiao | A63F 13/5375 |
| 2023/0078592 | A1 * | 3/2023 | Pan | G06F 3/0484 |
| | | | | 715/764 |
| 2023/0241501 | A1 * | 8/2023 | Wu | A63F 13/5372 |
| | | | | 463/31 |
| 2023/0356080 | A1 * | 11/2023 | Zheng | A63F 13/52 |

FOREIGN PATENT DOCUMENTS

| | | |
|---|---|---|
| CN | 111228806 A | 6/2020 |
| CN | 111773656 A | 10/2020 |
| CN | 112402977 A | 2/2021 |
| CN | 113117330 A | 7/2021 |
| CN | 113893542 A | 1/2022 |
| CN | 114425161 A | 5/2022 |

OTHER PUBLICATIONS

Vickriman. AoE, DoT, and DR Guide for Pillars of Eternity. Youtube.com. Online. Apr. 21, 2015. Accessed via the Internet. Accessed Oct. 17, 2025. <URL: https://www.youtube.com/watch?v=SvoqvSil1t4> (Year: 2015).*

Still can't figure out circles under characters in battle . . . steamcommunity.com. Online. Apr. 10, 2015. Accessed via the Internet. Accessed Oct. 27, 2025. <URL: https://steamcommunity.com/app/291650/discussions/0/618458030686068935/> (Year: 2015).*

Hitscan. Wikipedia.org. Online. Dec. 7, 2021. Accessed via the Internet. Accessed Oct. 27, 2025. <URL: https://en.wikipedia.org/w/index.php?title=Hitscan&oldid=1059130587> (Year: 2021).*

International Search Report and Written Opinion with regard to PCT/CN2022/100794 mailed Sep. 29, 2022.

English Abstract for CN114425161 retrieved on Espacenet on Sep. 6, 2023.

English Abstract for CN107837529 retrieved on Espacenet on Sep. 6, 2023.

English Abstract for CN113893542 retrieved on Espacenet on Sep. 6, 2023.

English Abstract for CN113117330 retrieved on Espacenet on Sep. 6, 2023.

English Abstract for CN111773656 retrieved on Espacenet on Sep. 6, 2023.

Notification to Grant with regard to the counterpart CN Patent Application No. 2022100887503 issued Jun. 12, 2025.

Office Action regard to the counterpart CN Patent Application No. 2022100887503 issued Dec. 26, 2024.

Search Report with regard to the counterpart CN Patent Application No. 2022100887503 dated Dec. 25, 2024.

* cited by examiner

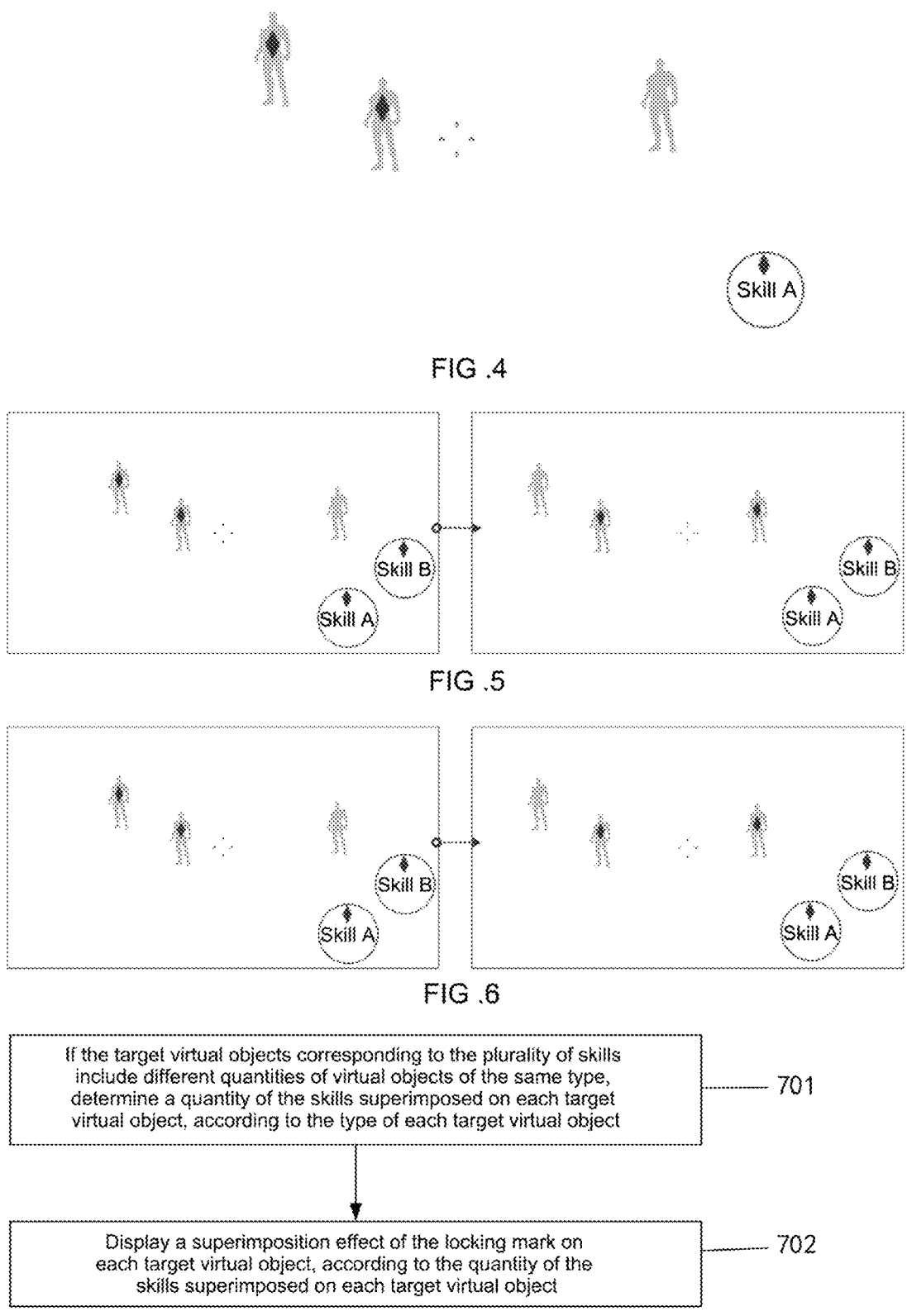

| If the target virtual objects corresponding to the plurality of skills include different quantities of virtual objects of the same type, determine a quantity of the skills superimposed on each target virtual object, according to the type of each target virtual object | —— 701 |

| Display a superimposition effect of the locking mark on each target virtual object, according to the quantity of the skills superimposed on each target virtual object | —— 702 |

FIG .7

TARGET LOCKING METHOD AND APPARATUS, ELECTRONIC DEVICE, AND STORAGE MEDIUM

CROSS-REFERENCE TO RELATED APPLICATION

The present disclosure is the U.S. National Stage Application of International Application No. PCT/CN2022/100794, filed on Jun. 23, 2022, which is based upon and claims priority to Chinese Patent Application No. 202210088750.3 filed on Jan. 25, 2022 and entitled "TARGET LOCKING METHOD AND APPARATUS, ELECTRONIC DEVICE, AND STORAGE MEDIUM", the entire content of both of which is incorporated herein by reference for all purposes.

TECHNICAL FIELD

The present disclosure relates to the technical field of human-computer interaction, and in particular to a target locking method and apparatus, an electronic device, and a storage medium.

BACKGROUND

With the rapid development of networks, various online games such as action games, strategy games, fighting games, shooting games, role-playing games, racing games, and card games have emerged. In some game scenarios, a character operated by a player needs to release skills to an enemy or teammate. During the process of releasing the skills, an object to which the skills may be released will be marked. In the conventional marking manner, generally, a mark can be applied only on a target object of a single target skill, so as to guide the player in the game.

However, in the conventional manner, the target skill can only aim at a single target, which cannot meet requirements of some complex scenarios.

SUMMARY

The present disclosure provides a target locking method and apparatus, an electronic device, and a storage medium, so as to meet a target locking requirement of a complex scenario.

The following embodiments are provided in the present disclosure.

An embodiment of the present disclosure provides a target locking method, including: determining, by a terminal, an anchor point position, where a graphical user interface is provided by the terminal, and a plurality of virtual objects are displayed on the graphical user interface; determining, from the plurality of virtual objects, a plurality of target virtual objects corresponding to a target skill, according to a relative position of each virtual object to the anchor point position and the target skill; and displaying a locking mark on a target virtual object.

The present disclosure further provides an electronic device, including: a processor, a storage medium, and a bus, where the storage medium stores program instructions executable by the processor, where when the electronic device is running, the processor and the storage medium communicate via the bus, and the processor executes the program instructions to perform steps of a target locking method, with the target locking method including: determining, by the electronic device, an anchor point position, where a graphical user interface is provided by the electronic device, and a plurality of virtual objects are displayed on the graphical user interface; determining, from the plurality of virtual objects, a plurality of target virtual objects corresponding to a target skill, according to a relative position of each virtual object to the anchor point position and the target skill; and displaying a locking mark on a target virtual object.

The present disclosure further provides a non-transitory computer-readable storage medium, storing a computer program thereon, where the computer program, when executed by a processor, performs steps of a target locking method, with the target locking method including: determining, by a terminal, an anchor point position, where a graphical user interface is provided by the terminal, and a plurality of virtual objects are displayed on the graphical user interface; determining, from the plurality of virtual objects, a plurality of target virtual objects corresponding to a target skill, according to a relative position of each virtual object to the anchor point position and the target skill; and displaying a locking mark on a target virtual object.

BRIEF DESCRIPTION OF DRAWINGS

To more clearly illustrate the embodiments of the present disclosure, the drawings required in the embodiments will be briefly described below. It should be understood that the following drawings only illustrate some embodiments of the present disclosure and therefore should not be considered as limitations of the scope, and for those of ordinary skill in the art, other related drawings can be obtained according to these drawings without creative efforts.

FIG. 4 is a schematic diagram of a display manner of a locking mark on a target skill according to one or more embodiments of the present disclosure;

FIG. 5 is a schematic diagram of display of a locking mark on another target virtual object according to one or more embodiments of the present disclosure;

FIG. 6 is a schematic diagram of display of a locking mark on still another target virtual object according to one or more embodiments of the present disclosure;

FIG. 7 is a flowchart of a target locking method according to one or more embodiment of the present disclosure;

DETAILED DESCRIPTION

Figure 1:
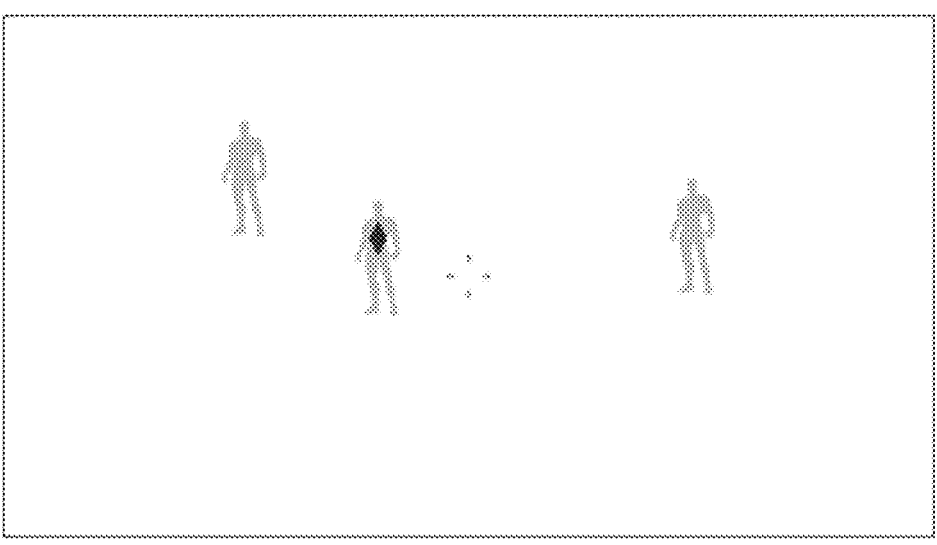
FIG. 1 is a schematic diagram of a target locking result of a conventional target locking method.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module." "sub-module." "circuit." "sub-circuit." "circuitry." "sub-circuitry." "unit." or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the present disclosure, unless otherwise specified and limited, in the description of the present disclosure, "a plurality of" means at least two, for example, two or three unless specifically limited otherwise. Terms "include", "comprise", or any other variants thereof are intended to cover a non-exclusive inclusion, so that a process, a method, an article, or a device that includes a list of elements not only includes those elements, but also includes other elements which are not expressly listed, or further includes elements inherent to this process, method, article, or device. Without further limitation, an element defined by the phrase "including a/an . . . " does not exclude the presence of another identical elements in the process, method, article or device that includes the element.

In the game, players can release skills to various virtual objects. To enrich game playing manners, in a part of games, when the automatic locking skills are released, a specified type of virtual objects near a crosshair or a mouse position can be automatically locked, so that the virtual objects that are closest to the crosshair or the mouse position are prompted to the players. For example, when a play releases an automatic tracking magic arrow, an enemy that is closest to the crosshair may be automatically hit. Before a player releases such an automatic locking skill, a system needs to mark a character that can be attacked or locked by the skill, so as to prompt the player which virtual object is closest to the crosshair or the mouse position, and this character can be automatically tracked after the skill is released. FIG. 1 is a schematic diagram of a target locking result of a conventional target locking method. As shown in FIG. 1, three virtual objects appear in a screen, skill A can lock on one enemy, where a mark appears on one enemy that is closest to a crosshair according to internal locking logic setting, and the marked enemy will be hit after the skill A is released.

However, in the conventional target locking method, it is impossible to implement a use scenario in which a virtual object is locked simultaneously by a plurality of skills or various types of different virtual objects are locked by a skill. For the problem that some complex scenarios cannot be met in the conventional manners, embodiments of the present disclosure provide a plurality of possible examples to help players mark and distinguish skills and objects locked by the skills when a plurality of different skills lock on different types of objects. The following is explained and described by a plurality of examples with reference to the accompanying drawings. The target locking method of the present disclosure may be operated in a terminal such as an electronic device or a server. The electronic device may be a local terminal (for example, a desktop computer, a notebook computer, a smart television, and a smart phone). When the in-game target locking method is operated in the server, the method may be implemented and performed based on a cloud system, where the cloud interaction system includes a server and a client device.

In some examples according to the present disclosure, various cloud applications, for example, a cloud game, may be operated under the cloud system. The cloud game is taken as an example, and the cloud game refers to a game mode based on cloud computing. In the running mode of the cloud game, a main body for running a game program is separated from that for presenting a game picture, and the storage and operation of the in-game target locking method is completed on a cloud game server. The client device is configured to receive and send data and present the game picture, for example, the client device may be a display device with a data transmission function close to the user side, such as a mobile terminal, a television, a computer, and a palm-held computer; however, the terminal performing information processing is the cloud game server in the cloud. When a game is played, a player operates the client device to send an operation instruction to the cloud game server, and the cloud game server runs the game according to the operation instruction, where data such as game screens are coded and compressed, and returned to the client device through a network, and finally, the data are decoded through the client device and the game screens are outputted.

According to the target locking method of the present disclosure, a graphical user interface is provided by a terminal, and the graphical user interface displays a plurality of virtual objects.

It should be noted that the terminal may include a human-computer interaction display apparatus, which is configured to present a graphical user interface, where the graphical user interface includes a game picture, and the terminal, after running a game, generates the graphical user interface and controls the display of the graphical user interface on the human-computer interaction display device.

It should be further noted that a virtual object refers to a movable or interactive object in a game. The movable object may be a virtual character, a virtual animal, an animation character, and the like, for example, a character or an animal displayed in a three-dimensional virtual environment. In some examples, the virtual object is a three-dimensional stereo-model created based on animation skeleton technology. Each virtual object has its own shape and volume in a three-dimensional virtual environment, and occupies a part of the space in the three-dimensional virtual environment. In the present disclosure, a graphical user interface displays a plurality of virtual objects.

Figure 2:
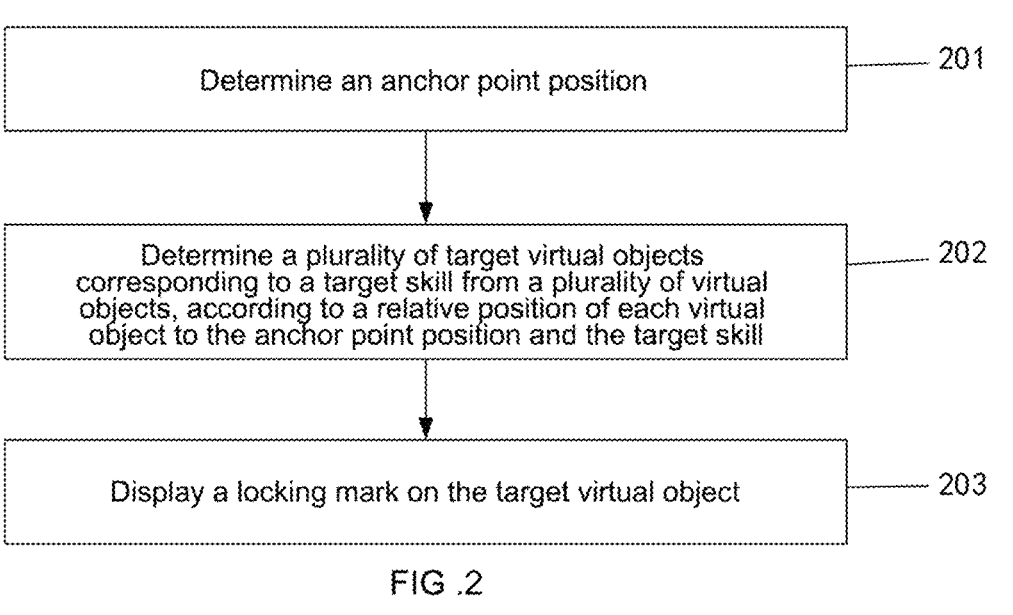
FIG. 2 is a flowchart of a target locking method according to one or more embodiments of the present disclosure.

FIG. 2 is a flowchart of a target locking method according to an embodiment of the present disclosure. As shown in FIG. 2, the method includes:

Step 201: determining an anchor point position.

It should be noted that an anchor point is a reference point for target locking, where the anchor point may be a reference point in a virtual scenario or a reference point on a graphical user interface.

The so-called virtual scenario is a virtual environment displayed (or provided) when the application runs on a terminal. The virtual environment may be a simulation environment of a real world, a semi-simulation and semi-fictional environment, or a purely fictitious environment, which is not limited in the present disclosure. The virtual environment may provide a battle environment for the virtual objects. In the virtual scenario, the anchor point may be a reference point in the virtual scenario. According to different dimensions of the virtual scenario, the anchor point may be a specific two-dimensional position point in a two-dimensional virtual scenario, or a position point with three-dimensional coordinates in a three-dimensional virtual scenario, and the like.

In addition, the anchor point may also be a reference point on a graphical user interface, for example, a crosshair on the graphical user interface, and the crosshair is actually a point on the graphical user interface. When a target is locked, a logical ray is emitted into the virtual scenario through the crosshair, so as to perform collision detection, thereby confirming the target.

Step 202: determining a plurality of target virtual objects corresponding to a target skill from a plurality of virtual objects, according to a relative position of each virtual object to the anchor point position and the target skill.

A plurality of target virtual objects are determined by the target skill and the relative position of each virtual object to the anchor point position. When the anchor point may be a reference point in the virtual scenario, according to the target skill, the plurality of target virtual objects may be determined by comparing a relative positional relationship between each virtual object and the anchor point in the virtual scenario. For example, if the target skill is a group attack against all types of virtual objects within a certain range, then the virtual objects within the range can be determined as the target virtual objects by comparing whether a distance between each virtual object and the anchor point in the virtual scenario is within a range required by the target skill. When the anchor point is a reference point on the graphical user interface, according to the target skills, a plurality of target virtual objects may be determined by comparing a planar relative positional relationship between the anchor point (e.g., the crosshair) and the virtual objects on the graphical user interface. The foregoing is merely an example, and in an example, other target virtual object determination manners may also be available, which is not limited in the present disclosure.

It should be noted that, in the present disclosure, in the determining the plurality of target virtual objects corresponding to the target skill from the plurality of virtual objects, the categories and the like of the virtual objects are not limited. That is, the plurality of virtual objects may belong to one or more object categories, and the obtained target virtual objects may also belong to one or more object categories.

Step 203: displaying a locking mark on the target virtual object.

Figure 3:
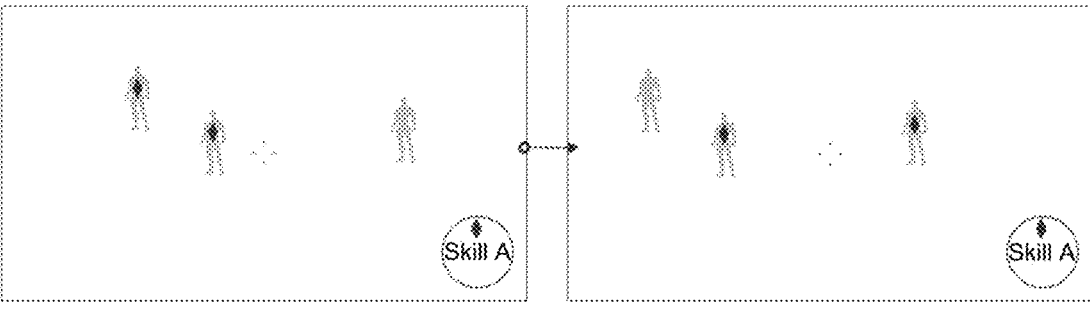
FIG. 3 is a schematic diagram of display of a locking mark on a target virtual object according to one or more embodiments of the present disclosure.

After the target virtual object is determined, a locking mark is displayed on the target object. FIG. 3 is a schematic diagram of display of a locking mark on a target virtual object according to an embodiment of the present disclosure. As shown in FIG. 3, skill A may lock on two virtual objects, and after step 202 is performed, two virtual objects that are closest to an anchor point are selected as the target virtual objects, and locking marks (i.e., diamond marks in FIG. 3) are displayed on the two target virtual objects. It should be noted that, a specific position at which the locking mark is displayed is not limited in the present disclosure, and it may be set by the developer based on an actual requirement. For example, the locking mark is displayed at a geometric center of the target virtual object, right above the head, and the like. It should be further noted that the locking mark refers to a mark that is displayed on the target virtual object and is configured to mark the target virtual object, and a secondary locking mark may identify that the target virtual object is in a target skill locking or targeting state. Optionally, the locking mark includes, but is not limited to, at least one of a stroke highlight effect, a skin material with a warning color, a text prompt, and a pattern mark. In addition, the specific mark style may be set according to a specific game style and model, which is not limited in the present disclosure.

In conclusion, an embodiment of the present disclosure provides a target locking method, where after an anchor point position is determined on a graphical user interface on which a plurality of virtual objects are displayed, a plurality of target virtual objects corresponding to a target skill are determined from a plurality of virtual objects, according to a relative position of each virtual object to the anchor point position and the target skill, and a locking mark is displayed on the target virtual objects. Compared with the conventional target locking, this target locking method can lock on various types of different virtual objects, so that the requirements of some complex scenarios are met, and the target locking manner of the target skill is enriched, helping the player to mark the target skill and distinguish the target skill from the target virtual objects that it locks.

In some examples, on the basis of FIG. 2, the present disclosure further provides a possible example of an application of the target locking method, where the method includes:

in response to a release instruction for the target skill, releasing the target skill to the target virtual object.

Through step 203, the locking mark is displayed on the target virtual object, so that the release object of the target skill is identified. In this case, if a release instruction for the target object is received, the target skill can be released to the target virtual object in response to the release instruction, so that a guided target skill release for the target virtual object is implemented, and the game playing manner is enriched.

In some examples, on the basis of FIG. 2, the present disclosure further provides a possible example of displaying a locking mark in the target locking method, where displaying the locking mark on the target virtual object includes:

displaying a locking mark corresponding to a type of the target virtual object on the target virtual object, according to the type of the target virtual object.

It should be noted that, since the target virtual object may belong to different types, to better help the player mark and distinguish the types of the target virtual object, locking marks corresponding to the types of the target virtual object are displayed on the target virtual object. It should be noted that, the classification of the types of the target virtual object is implemented based on target skills, and any one of the target virtual objects may belong to one or more types. That is, there may be intersections between a plurality of types of target virtual objects, for example, a target virtual object corresponding to a target skill A is of an M type, and a target virtual object corresponding to a target skill B is of an N type, and then there may be one target virtual object that is a target virtual object corresponding to both skill A and skill B. For such a virtual object, the locking marks corresponding to two types may be displayed simultaneously. The foregoing is merely an example. In an example, other setting manners may also be available, which is not limited in the present disclosure.

In some examples, on the basis of FIG. 2, the present disclosure further provides a possible example of displaying a locking mark in the target locking method, where the method includes:

displaying the locking mark on the target skill displayed on the graphical user interface.

To enable a user to know a correspondence between a locking mark and a target skill corresponding to the locking mark more intuitively, the locking mark corresponding to the target skill is displayed on the target skill displayed on the graphical user interface. FIG. 4 is a schematic diagram of a display manner of a locking mark on a target skill according to an embodiment of the present disclosure. As shown in FIG. 4, the user can determine a correspondence between a target skill and a target virtual object that have a same locking mark by observing a locking mark on the target skill and a locking mark of the target virtual object, so that the problem that a correspondence between the target skill and the target virtual object is ambiguous is avoided, especially when a plurality of skills and various locking marks exist, and the game experience can be optimized to a great extent by displaying the locking marks on the target skills displayed on the graphical user interface.

In some examples, on the basis of the foregoing embodiment, the present disclosure further provides a possible example of displaying a locking mark in the target locking method, where the displaying a locking mark at a position corresponding to each target virtual object, according to a type of the target virtual object includes:

displaying a same mark for a same type of the target virtual objects according to the types of the target virtual objects.

The display of the locking mark aims at prompting target virtual objects determined according to an anchor point position to a user. Since a plurality of target skills may correspond to the same type of target virtual objects, the same locking mark can be added to the same type of target virtual objects during identification, thereby avoiding the situations where when the plurality of target skills correspond to the same type of target virtual object, repeated marking is caused by instability or error of the system, and the like, and optimizing the locking mark display, so that the identification logic of the locking mark is clearer.

In some examples, on the basis of the foregoing embodiment, when the target skill includes a plurality of skills, the present disclosure further provides a possible example of display of a locking mark in the target locking method, where the displaying a locking mark corresponding to a type of the target virtual object at a position corresponding to the target virtual object according to the type of the target virtual object includes:

displaying a same locking mark for a same type of the target virtual objects corresponding to the plurality of skills according to the type of the target virtual objects.

When the target skill includes a plurality of skills, if the plurality of skills can lock on the same type of objects, the plurality of skills share one locking mark. FIG. 5 is a schematic diagram of display of a locking mark on another target virtual object according to an embodiment of the present disclosure. As shown in FIG. 5, if the types of the target virtual objects corresponding to skill A and skill B are the same, the same locking mark are displayed on the target virtual objects corresponding to skill A and skill B. Further, the same locking mark is also displayed on skill A and skill B displayed on the graphical user interface.

In some examples, on the basis of the foregoing embodiment, the present disclosure further provides a possible example of display of a locking mark in the target locking method, where the displaying a same locking mark for a same type of the target virtual objects corresponding to a plurality of target skills according to the types of the target virtual objects includes:

if the target virtual objects corresponding to the plurality of skills include a same quantity of the same type of virtual objects, displaying the same locking mark for the same type of the target virtual objects corresponding to the plurality of skills according to the type of each target virtual object.

That is, if the quantity and type of the target virtual objects targeted by each of the plurality of target skills are both the same, that is, when a plurality of skills can lock on the same quantity of target virtual objects of the same type, these skills share one type of mark. FIG. 6 is a schematic diagram of display of a locking mark on still another target virtual object according to an embodiment of the present disclosure. As shown in FIG. 6, the target virtual objects corresponding to skill A and skill B include the same quantity of target virtual objects of the same type (for example, the target virtual objects corresponding to skill A and skill B in the figure include two target virtual objects of human type, respectively), then the same locking mark are displayed on the target virtual objects of the same type corresponding to skill A and skill B (that is, the target virtual objects of human type in the figure).

In some examples, on the basis of the foregoing embodiment, the present disclosure further provides a possible example of display of a locking mark in the target locking method. FIG. 7 is a flowchart of a target locking method according to another embodiment of the present disclosure. As shown in FIG. 7, the method includes:

Step 701: if the target virtual objects corresponding to the plurality of skills include different quantities of same type of virtual objects, determining a quantity of skills superimposed on each target virtual object according to the type of each target virtual object.

When the target virtual objects corresponding to a plurality of skills include different quantities of virtual objects of the same type, in this type of the target virtual objects, a quantity of skills corresponding to a part of the target virtual objects is greater than a quantity of skills corresponding to another part of the target virtual objects. In this case, if the same locking mark is used, the difference of the quantity of skills corresponding to the target virtual objects cannot be reflected, so that it is necessary to determine a quantity of skills superimposed on the target virtual objects, and perform subsequent processing according to the quantity, so as to display the difference of the quantity of skills superimposed on different target virtual objects.

Step 702: displaying a superimposition effect of the locking mark on each target virtual object according to the quantity of skills superimposed on each target virtual object.

Figures 8, 9, 10, 11:
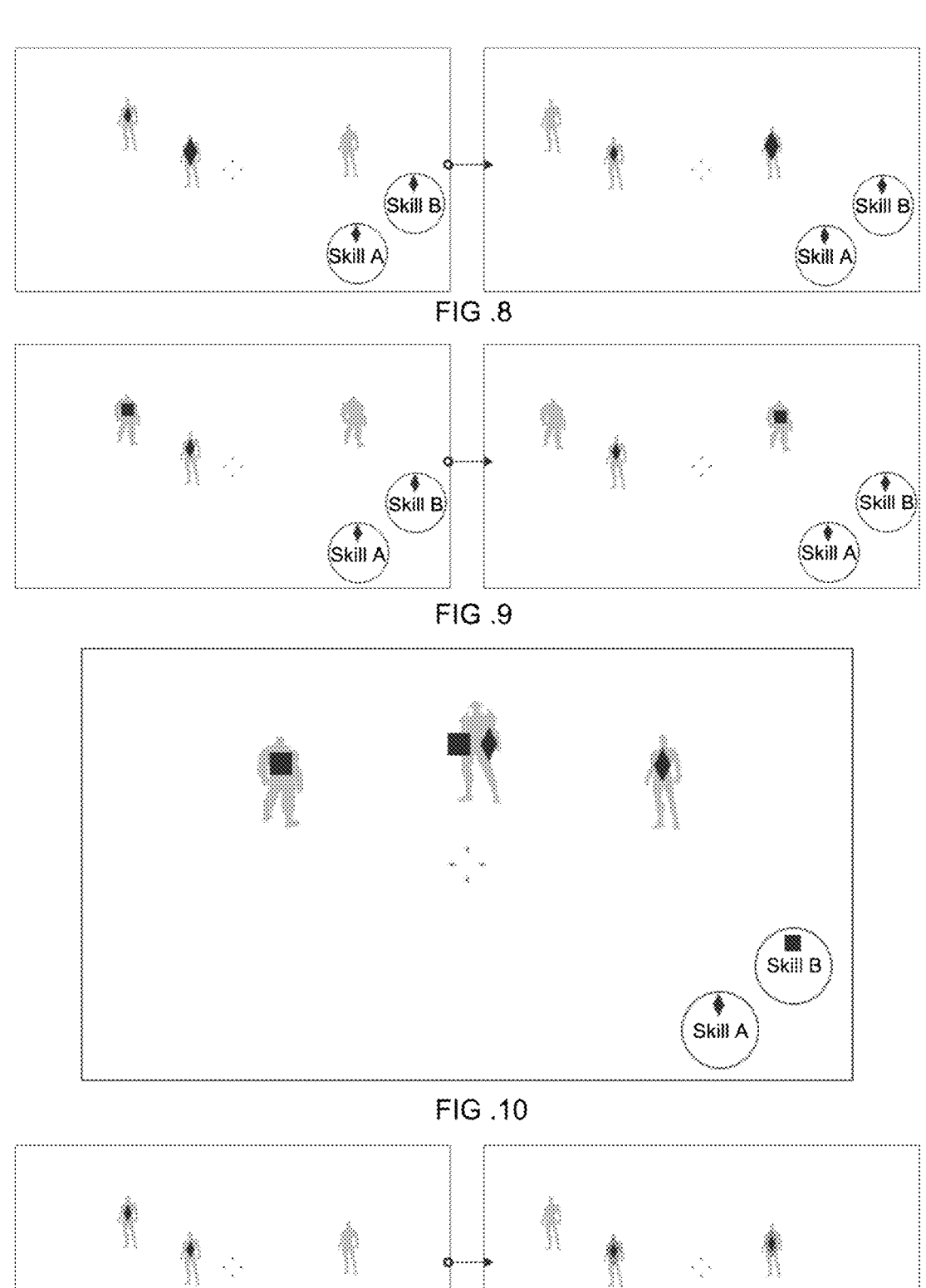
FIG. 8 is a schematic diagram of display of a locking mark on yet another target virtual object according to one or more embodiments of the present disclosure.
FIG. 9 is a schematic diagram of display of a locking mark on yet another target virtual object according to one or more embodiments of the present disclosure.
FIG. 10 is a schematic diagram of display of a locking mark on yet another target virtual object according to one or more embodiments of the present disclosure.
FIG. 11 is a schematic diagram of display of a locking mark on yet another target virtual object according to one or more embodiments of the present disclosure.

A quantity of the skills superimposed on each target virtual object is determined, and the difference of the quantity of the skills superimposed on different target virtual objects can be displayed by adding a superimposition effect on the locking mark. It should be noted that the superimposition effect is only to display the difference of a quantity of the skills superimposed on different target virtual objects. The specific form of the superimposition effect is not limited in the present disclosure, as long as the difference of the quantity of skills may be reflected. FIG. 8 is a schematic diagram of display of a locking mark on yet another target virtual object according to an embodiment of the present disclosure. As shown in FIG. 8, skill A may lock on two enemies, skill B may lock on one enemy, and the locking mark of the target virtual object that is simultaneously locked by skill A and skill B are displayed with a greater superimposition effect. As shown in the left part of FIG. 8, the mark of the enemy that is closest to the anchor point is greater than the mark of the enemy that is second closest to the anchor point. Similarly, when there are more skills, the superimposition effect on the locking mark may also gradually increase with the increase of the quantity of skills that are superimposed, for example, a size becomes larger and larger. The size, magnification, and the like of the specific superimposition effect are determined according to specific game settings, and this is not limited by the present disclosure, as long as the superimposition difference of different quantities of skills can be reflected.

In some examples, on the basis of the foregoing FIG. 7, the present disclosure further provides a possible example of a superimposition effect in the target locking method, where the superimposition effect includes at least one of: deformation of the locking mark, and addition of an indicator.

It should be noted that the deformation of the locking mark may be, for example, enlargement, stretching, rotation, inversion, twisting, or the like of the locking mark; the addition of the indicator is to present a superimposition effect by adding a pattern, a number, a character, and other marks on the basis of the locking mark, for example, adding a number or text corresponding to a quantity of times on the locking mark to identify a quantity of superimpositions, or adding different patterns on the locking mark. The foregoing is merely an example, and the superimposition effect may also be implemented in other manners, which is not limited in the present disclosure.

In some examples, on the basis of the foregoing embodiment, when the target skill includes a plurality of skills, the present disclosure further provides a possible example of displaying a locking mark in the target locking method, where the displaying a locking mark corresponding to a type of the target virtual object at a position corresponding to the target virtual object according to the type of the target virtual object includes:

if the target virtual objects corresponding to the plurality of skills include different types of virtual objects, displaying different locking marks, for different types of the target virtual objects corresponding to the plurality of skills, according to the type of each target virtual object.

When the target virtual objects corresponding to the plurality of skills include different types of virtual objects, to distinguish the virtual objects corresponding to the different skills, different locking marks are displayed for the target virtual objects corresponding to the different skills, according to the types of the target virtual objects. FIG. 9 is a schematic diagram of display of a locking mark on yet another target virtual object according to an embodiment of the present disclosure. As shown in FIG. 9, the target virtual objects corresponding to skill A and skill B include different types of virtual objects, the target virtual object corresponding to skill A is identified by a diamond-shaped locking mark, and the target virtual object corresponding to skill B is identified by a rectangular locking mark, so that the two types of virtual objects corresponding to the two skills are displayed in a distinguishing manner.

In some examples, on the basis of FIG. 2, the present disclosure further provides a possible example of displaying a locking mark in the target locking method, where the target skill includes a plurality of skills, and the displaying the locking mark at the position corresponding to each target virtual object includes:

if target virtual objects corresponding to different skills in the plurality of skills include a plurality of same virtual objects, displaying locking marks corresponding to the different skills on the same virtual objects.

When the types of target virtual objects targeted by each of the plurality of target skills are different, one virtual object is targeted by a plurality of target skills, the marks of the plurality of target skills can be displayed simultaneously. FIG. 10 is a schematic diagram of display of a locking mark on yet another target virtual object according to an embodiment of the present disclosure. As shown in FIG. 10, the target virtual objects corresponding to skill A and skill B include different types of virtual objects, where the target virtual object corresponding to skill A is identified by a diamond-shaped locking mark, and the target virtual object corresponding to skill B is identified by a rectangular locking mark. When a target virtual object is locked by different types of skills, for example, the target virtual object located in the middle in FIG. 10 is simultaneously locked by skill A and skill B, the locking marks corresponding to different skills are displayed on the target virtual object, that is, the locking marks of skill A and skill B are simultaneously displayed on the target virtual object located in the middle. It should be noted that, when a plurality of locking marks are simultaneously displayed on one target virtual object, a specific arrangement manner (for example, a left-right arrangement, an up-down arrangement, and the like)

and arrangement order (for example, setting a group attack skill mark ahead, setting a more powerful skill mark ahead, and the like) of the plurality of locks are not limited, and the user can set the locking marks based on an actual requirement.

In some examples, on the basis of any of the foregoing embodiments, the present disclosure further provides a possible example of the target locking method, where after the displaying the locking mark at the position corresponding to each target virtual object, the method further includes:

> in response to a strengthened touch operation for the target skill, displaying a strengthened effect of the locking mark.

After the locking mark is displayed, when the target virtual object corresponding to the target skill needs to be determined quickly due to the display precision of a graphical user interface, the flexibility requirement in the game by a user, or the like, the locking mark of the target virtual object can display a strengthened effect by inputting a strengthened touch operation. The strengthened touch operation may be, for example, a long press operation, a preset gesture, or the like, and the strengthened effect may be, for example, highlighting, enlargement, color change, and the like. The specific operation form of the strengthened touch operation, the specific form of the strengthened effect, and the like are not limited in the present disclosure. It should be noted that the specific operation form of the strengthened touch operation cannot conflict with other operations. For example, if a long-pressing skill button has an acceleration effect in the game, in order to maintain the stable operation of the game, long-press cannot be set as a strengthened touch operation at the same time.

In a possible example, FIG. 11 is a schematic diagram of display of a locking mark on yet another target virtual object according to an embodiment of the present disclosure. As shown in FIG. 11, when the long-pressing skill button has no other function, the long-press is set as a strengthened touch operation, and after a specific duration for the long-press, the mark on the locked object corresponding to the skill will be highlighted (i.e., the strengthened effect is highlighting), so as to prompt the target virtual object corresponding to the skill to player.

In some examples, on the basis of any of the foregoing embodiments, the present disclosure further provides a possible example of the target locking method, where the displaying the locking mark on the target virtual object includes:

> displaying the locking mark, at a geometric center of a bounding box on the target virtual object.

In the game, according to different game scenarios, the shapes, the existing forms, and the like of the virtual objects may be different. The locking marks can be uniformly set to be displayed at the geometric center of the bounding box on the target virtual object, and user can determine an approximate position of the target virtual object according to a display position of the locking mark, so that the game experience is optimized.

In some examples, on the basis of any of the above embodiments, the present disclosure further provides a possible example of the target locking method, where the anchor point position is: a reference point in a virtual scenario, a preset position on the graphical user interface, or a crosshair of a controlled virtual object in a game scenario.

In the above embodiments, it is explained that the anchor point may be a preset position on the graphical user interface, such as a crosshair on the graphical user interface in a shooting game; or it may be a reference point in the virtual scenario, such as a mouse position. In addition, the anchor point may further be a crosshair of a controlled virtual object in the game scenario, where the so-called controlled virtual object is a player character (a character played by a player in the game), and the anchor point may be a determined crosshair (such as a target in a shooting game) position of the controlled virtual object in the game scenario, and the like.

The following describes the target locking apparatus, the electronic device, and the storage medium provided by the present disclosure, and specific implementation process and technical effects thereof are referred to above and will not be described in detail below.

Figures 12, 13:
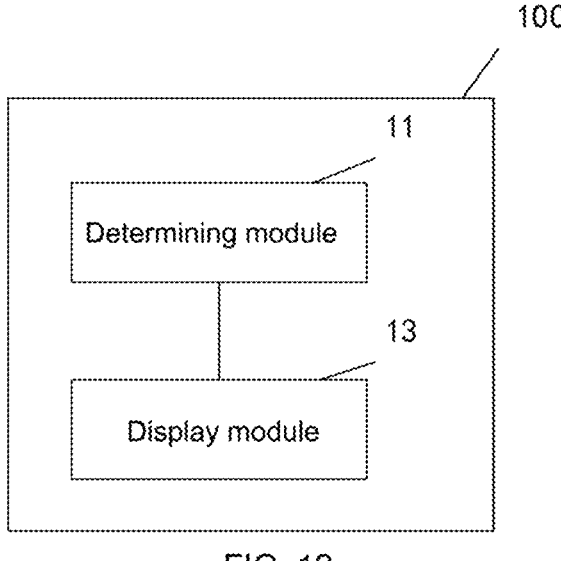
FIG. 12 is a flowchart of a target locking apparatus according to one or more embodiments of the present disclosure.
FIG. 13 is a schematic diagram of an electronic device according to one or more embodiments of the present disclosure.

An embodiment of the present disclosure provides a possible example of a target locking apparatus, which can execute the target locking method provided by the above embodiments. FIG. 12 is a flowchart of a target locking apparatus according to an embodiment of the present disclosure. As shown in FIG. 12, the above target locking apparatus 100 includes: a determining module 11, and a display module 13;

> the determining module 11 is configured to determine an anchor point position, and determine a plurality of target virtual objects corresponding to a target skill from a plurality of virtual objects, according to a relative position of each virtual object to the anchor point position and the target skill; and
> the display module 13 is configured to display a locking mark on the target virtual object.

In some examples, the target locking apparatus 100 further includes: a release module, configured to release the target skill to the target virtual object in response to a release instruction for the target skill.

In some examples, the display module 13 is configured to display a locking mark corresponding to a type of the target virtual object, on the target virtual object, according to the type of the target virtual object.

In some examples, the display module 13 is configured to display the locking mark, on the target skill displayed on the graphical user interface.

In some examples, the display module 13 is configured to display a same mark for a same type of the target virtual objects, according to the types of the target virtual objects.

In some examples, the target skill includes a plurality of skills; and the display module 13 is configured to display a same locking mark, for a same type of the target virtual objects corresponding to the plurality of skills, according to the types of the target virtual objects.

In some examples, the display module 13 is configured to display the same locking mark, for the same type of the target virtual objects corresponding to the plurality of skills, according to the type of each target virtual object, if the target virtual objects corresponding to the plurality of skills include the same quantity of same-type virtual objects.

In some examples, the determining module 11 is configured to determine a quantity of skills superimposed on each target virtual object, according to the type of each target virtual object, if the target virtual objects corresponding to the plurality of skills include different quantities of the same type of virtual objects; and > the display module 13 is configured to display a superimposition effect of the locking mark on each target virtual object, according to the quantity of skills superimposed on each target virtual object.

In some examples, the display module 13 is configured to display different locking marks, for different types of the target virtual objects corresponding to the plurality of skills, according to the type of each target virtual object, if the target virtual objects corresponding to the plurality of skills include different types of virtual objects.

In some examples, the display module 13 is configured to, display locking marks corresponding to different skills on same virtual objects, if target virtual objects corresponding to the different skills in the plurality of skills include a plurality of the same virtual objects.

In some examples, the display module 13 is configured to display a strengthened effect of the locking mark in response to a strengthened touch operation for the target skill.

In some examples, the display module 13 is configured to display the locking mark at a geometric center of a bounding box on the target virtual object.

The foregoing apparatus is configured to perform the method according to the aforementioned embodiments, where the implementation principle and technical effect are similar to that of the method and will not be described in detail here.

The above modules may be one or more integrated circuits configured to implement the above methods, for example, one or more application specific integrated circuits (ASICs), or one or more digital signal processors (DSPs), or one or more field programmable gate arrays (FPGAs), or the like. For another example, when a certain module in the above is implemented in the form of a processing element scheduler code, the processing element may be a general purpose processor, for example, a central processing unit (CPU) or other processors capable of calling program code. For still another example, these modules may be integrated together and implemented in the form of system-on-a-chip (SOC).

An embodiment of the present disclosure provides a possible example of an electronic device, which can execute the target locking method provided by the above embodiments. FIG. 13 is a schematic diagram of an electronic device according to an embodiment of the present disclosure. This device may be integrated into a terminal or a chip of the terminal, and the terminal may be a computing device with data processing function.

The electronic device includes: a processor 1301, a storage medium 1302, and a bus. The storage medium stores program instructions executable by the processor, where when the device is controlled to run, the processor and the storage medium communicate via the bus, and the processor executes the program instructions to perform steps of the target locking method.

For example, the steps of the above target locking method may include:

determining an anchor point position;

determining a plurality of target virtual objects corresponding to a target skill, from a plurality of virtual objects, according to a relative position of each virtual object to the anchor point position and the target skill; and displaying a locking mark on the target virtual object.

In some examples, the method further includes:

in response to a release instruction for the target skill, releasing the target skill to the target virtual object.

In some examples, the displaying a locking mark on the target virtual object includes:

displaying a locking mark corresponding to a type of the target virtual object, at a position corresponding to the target virtual object, according to the type of the target virtual object.

In some examples, the method further includes:

displaying the locking mark, on the target skill displayed on the graphical user interface.

In some examples, the displaying a locking mark at a position corresponding to each target virtual object, according to a type of the target virtual object includes:

displaying a same mark, for a same type of the target virtual objects, according to the types of the target virtual objects.

In some examples, the target skill includes a plurality of skills, and the displaying a locking mark corresponding to a type of the target virtual object, on the target virtual object, according to the type of the target virtual object, includes:

displaying a same locking mark, for a same type of the target virtual objects corresponding to the plurality of skills, according to the types of the target virtual objects.

In some examples, the displaying a same locking mark for a same type of the target virtual objects corresponding to a plurality of target skills, according to the types of the target virtual objects, includes:

if the target virtual objects corresponding to the plurality of skills include a same quantity of the same type of virtual objects, displaying the same locking mark, for the same type of the target virtual objects corresponding to the plurality of skills, according to the type of each target virtual object.

In some examples, the method further includes:

if the target virtual objects corresponding to the plurality of skills include different quantities of the same type of the virtual objects, determining a quantity of skills superimposed on each target virtual object, according to the type of each target virtual object; and displaying a superimposition effect of the locking mark on each target virtual object, according to the quantity of skills superimposed on each target virtual object.

In some examples, the superimposition effect includes at least one of: a deformation of the locking mark, and an addition of an indicator.

In some examples, the target skill includes a plurality of skills, and the displaying a locking mark corresponding to a type of the target virtual object, at a position corresponding to the target virtual object, according to the type of the target virtual object includes:

if the target virtual objects corresponding to the plurality of skills include different types of virtual objects, displaying different locking marks, for different types of the target virtual objects corresponding to the plurality of skills, according to the type of each target virtual object.

In some examples, the target skill includes a plurality of skills; and the displaying a locking mark, at a position corresponding to each target virtual object, includes:

if target virtual objects corresponding to different skills in the plurality of skills include a plurality of same virtual objects, displaying locking marks corresponding to the different skills, on the same virtual objects.

In some examples, after the displaying a locking mark at a position corresponding to each target virtual object, the method further includes:

in response to a strengthened touch operation for the target skill, displaying a strengthened effect of the locking mark.

In some examples, the displaying a locking mark on the target virtual object includes:

displaying the locking mark at a geometric center of a bounding box on the target virtual object.

In some examples, the anchor point position is: a reference point in a virtual scenario, a preset position on the graphical user interface, or a crosshair of a controlled virtual object in a game scenario.

With the foregoing examples, after an anchor point position is determined on a graphical user interface on which a plurality of virtual objects are displayed, a plurality of target virtual objects corresponding to a target skill are determined from a plurality of virtual objects according to a relative position of each virtual object to the anchor point position and the target skill, and a locking mark is displayed on the target virtual objects. Compared with the conventional target locking, various types of different virtual objects can be locked, so that the requirements of some complex scenarios are met, and the target locking manner of the target skills is enriched, helping the player to mark the target skill and distinguish the target skill from the target virtual objects that it locks.

An embodiment of the present disclosure provide a possible implementation example of a non-transitory computer-readable storage medium capable of executing the target locking method provided in the foregoing embodiments. The storage medium has a computer program stored thereon, and the computer program, when executed by a processor, performs steps of the target locking method.

For example, the steps of the above target locking method may include:

determining an anchor point position;

determining a plurality of target virtual objects corresponding to a target skill, from a plurality of virtual objects, according to a relative position of each virtual object to the anchor point position and the target skill; and displaying a locking mark on the target virtual object.

In some examples, the method further includes:

in response to a release instruction for the target skill, releasing the target skill to the target virtual object.

In some examples, the displaying a locking mark on the target virtual object includes:

displaying a locking mark corresponding to a type of the target virtual object, at a position corresponding to the target virtual object, according to the type of the target virtual object.

In some examples, the method further includes:

displaying the locking mark, on the target skill displayed on the graphical user interface.

In some examples, the displaying a locking mark at a position corresponding to each target virtual object according to a type of the target virtual object includes:

displaying a same mark, for a same type of the target virtual objects according to the types of the target virtual objects.

In some examples, the target skill includes a plurality of skills, and the displaying a locking mark corresponding to a type of the target virtual object, on the target virtual object according to the type of the target virtual object, includes:

displaying a same locking mark, for a same type of the target virtual objects corresponding to the plurality of skills, according to the types of the target virtual objects.

In some examples, the displaying a same locking mark for a same type of the target virtual objects corresponding to a plurality of target skills, according to the types of the target virtual objects, includes:

if the target virtual objects corresponding to the plurality of skills include a same quantity of the same type of virtual objects, displaying the same locking mark, for the same type of the target virtual objects corresponding to the plurality of skills, according to the type of each target virtual object.

In some examples, the method further includes:

if the target virtual objects corresponding to the plurality of skills include different quantities of the same type of the virtual objects, determining a quantity of skills superimposed on each target virtual object, according to the type of each target virtual object; and displaying a superimposition effect of the locking mark on each target virtual object according to the quantity of skills superimposed on each target virtual object.

In some examples, the superimposition effect includes at least one of: a deformation of the locking mark, and an addition of an indicator.

In some examples, the target skill includes a plurality of skills, and the displaying a locking mark corresponding to a type of the target virtual object, at a position corresponding to the target virtual object, according to the type of the target virtual object includes:

if the target virtual objects corresponding to the plurality of skills include different types of virtual objects, displaying different locking marks, for different types of the target virtual objects corresponding to the plurality of skills, according to the type of each target virtual object.

In some examples, the target skill includes a plurality of skills; and the displaying a locking mark, at a position corresponding to each target virtual object, includes:

if target virtual objects corresponding to different skills in the plurality of skills include a plurality of same virtual objects, displaying locking marks corresponding to the different skills, on the same virtual objects.

In some examples, after the displaying a locking mark at a position corresponding to each target virtual object, the method further includes:

in response to a strengthened touch operation for the target skill, displaying a strengthened effect of the locking mark.

In some examples, the displaying a locking mark on the target virtual object includes:

displaying the locking mark at a geometric center of a bounding box on the target virtual object.

In some examples, the anchor point position is: a reference point in a virtual scenario, a preset position on the graphical user interface, or a crosshair of a controlled virtual object in a game scenario.

With the foregoing examples, after an anchor point position is determined on a graphical user interface on which a plurality of virtual objects are displayed, a plurality of target virtual objects corresponding to a target skill are determined from a plurality of virtual objects according to a relative position of each virtual object to the anchor point position and the target skill, and a locking mark is displayed on the target virtual objects. Compared with the conventional target locking, various types of different virtual objects can be locked, so that the requirements of some complex scenarios are met, and the target locking manner of the target skills is enriched, helping the player to mark the target skill and distinguish the target skill from the target virtual objects that it locks.

A computer program stored in a storage medium may include several instructions for enabling a computer device (which may be a personal computer, a server, a network device, or the like) or a processor to perform all or part of the steps of the method described in the embodiments of the present disclosure. The foregoing storage medium includes:

a U-disk, a removable hard disk, a read-only memory (ROM), a random access memory (RAM), a magnetic disk, an optical disk, or other media capable of storing program codes.

The beneficial effects of the present disclosure include at least: a target locking method is provided by an embodiment of the present disclosure, where after an anchor point position is determined on a graphical user interface on which a plurality of virtual objects are displayed, a plurality of target virtual objects corresponding to a target skill are determined from a plurality of virtual objects according to a relative position of each virtual object to the anchor point position and the target skill, and a locking mark is displayed on the target virtual objects. Compared with the conventional target locking, various types of different virtual objects can be locked, so that the requirements of some complex scenarios are met, and the target locking manner of the target skills is enriched, helping the player to mark the target skill and distinguish the target skill from the target virtual objects that it locks.

In the several embodiments provided in the present disclosure, it should be understood that the disclosed apparatus and method may be implemented in other manners. For example, the described apparatus embodiment is merely illustrative. For example, a unit division is merely a logical function division and may be of other division manners in an example. For example, a plurality of units or components may be combined or integrated into another system, or some features may be ignored or not performed. In addition, the displayed or discussed mutual couplings or direct couplings or communication connection may be indirect couplings or communications connections via some interfaces, apparatus, or units, and may be in electrical, mechanical, or other forms.

Units described as separate parts may or may not be physically separate. Parts displayed as units may or may not be physical units, and to be specific, may be located in one position, or may be distributed on a plurality of network units. Some or all of the units may be selected based on actual requirements to achieve the objectives of the embodiments.

In addition, functional units in embodiments of the present disclosure may be integrated into one processing unit, or each of the units may exist alone physically, or two or more units may be integrated into one unit. The above integrated unit may be implemented in a form of hardware, or may be implemented as a combination of hardware and a software functional unit.

The above integrated unit implemented in a form of a software functional unit may be stored in a non-transitory computer-readable storage medium. The above software functional unit is stored in a storage medium, and includes several instructions for enabling a computer device (which can be a personal computer, a server, a network device, or the like) or a processor to implement all or part of the steps of the method described in the embodiments of the present disclosure. The foregoing storage medium includes: a U-disk, a removable hard disk, a read-only memory (ROM), a random access memory (RAM), a magnetic disk, an optical disk, or other media capable of storing program codes.

The above description is merely the specific embodiments of the present disclosure, however, the protection scope of the present disclosure is not limited thereto, and any modifications and substitutions that can be easily conceived by those skilled in the art within the technical scope disclosed by the present disclosure shall fall within the protection scope of the present disclosure. Therefore, the protection scope of the present disclosure shall be subject to the protection scope of the claims.

What is claimed is:

1. A target locking method, comprising:

determining, by a terminal, an anchor point position, wherein a graphical user interface is provided by the terminal, and a plurality of virtual objects are displayed on the graphical user interface;

determining, from the plurality of virtual objects, a plurality of target virtual objects corresponding to a target skill, according to a relative position of each virtual object to the anchor point position and the target skill, wherein the target skill comprises a plurality of skills; and displaying a locking mark on a target virtual object, wherein displaying the locking mark on the target virtual object comprises:

displaying the locking mark corresponding to a type of the target virtual object on the target virtual object, according to the type of the target virtual object;

displaying a same locking mark for a same type of target virtual objects corresponding to the plurality of skills, according to types of the target virtual objects;

in response to determining that the target virtual objects corresponding to the plurality of skills comprise different quantities of the virtual objects of the same type, determining a quantity of the skills superimposed on each target virtual object, according to the type of each target virtual object; and displaying a superimposition effect of the locking mark on each target virtual object, according to the quantity of the skills superimposed on each target virtual object.

2. The method according to claim 1, further comprising:

in response to a release instruction for the target skill, releasing the target skill to the target virtual object.

3. The method according to claim 1, further comprising:

displaying the locking mark, on the target skill displayed on the graphical user interface.

4. The method according to claim 1, wherein displaying the same locking mark, for the same type of the target virtual objects corresponding to the plurality of target skills, according to the types of the target virtual objects further comprises:

in response to determining that the target virtual objects corresponding to the plurality of skills comprise a same quantity of the virtual objects of the same type, displaying the same locking mark, for the same type of the target virtual objects corresponding to the plurality of skills, according to the type of each target virtual object.

5. The method according to claim 1, wherein the superimposition effect comprises at least one of: a deformation of the locking mark, or addition of an indicator.

6. The method according to claim 1, wherein displaying the locking mark corresponding to the type of the target virtual object, at a position corresponding to the target virtual object, according to the type of the target virtual object, further comprises:

in response to determining that target virtual objects corresponding to the plurality of skills comprise different types of the virtual objects, displaying different locking marks, for different types of the target virtual objects corresponding to the plurality of skills, according to the type of each target virtual object.

7. The method according to claim 1, wherein displaying the locking mark corresponding to the type of the target virtual object on the target virtual object further comprises:

in response to determining that target virtual objects corresponding to different skills in the plurality of skills comprise a plurality of same virtual objects, displaying the locking marks corresponding to the different skills, on the same virtual objects.

8. The method according to claim 1, comprising:

in response to a strengthened touch operation for the target skill, displaying a strengthened effect of the locking mark.

9. The method according to claim 8, wherein displaying the strengthened effect of the locking mark comprises:

in response to determining that a long-press operation is set as the strengthened touch operation, after a duration for the long-press operation, highlighting the locking mark on a locked virtual object corresponding to the target skill.

10. The method according to claim 1, wherein displaying the locking mark on the target virtual object further comprises:

displaying the locking mark, at a geometric center of a bounding box on the target virtual object.

11. The method according to claim 1, wherein the anchor point position comprises: a reference point in a virtual scenario, a preset position on the graphical user interface, or a crosshair of a controlled virtual object in a game scenario.

12. The method according to claim 11, wherein the crosshair comprises a point on the graphical user interface; and wherein determining the anchor point position comprises:

in response to determining that the target virtual object is locked, emitting a logical ray into the virtual scenario through the crosshair, so as to perform collision detection to confirm the target virtual object.

13. The method according to claim 11, wherein determining the plurality of target virtual objects corresponding to the target skill, from the plurality of virtual objects, comprises:

in response to determining that the target skill is a group attack against all types of the virtual objects within a range, determining the virtual objects within the range as the target virtual objects by comparing whether a distance between each virtual object and the anchor point in the virtual scenario is within a set range required by the target skill.

14. The method according to claim 1, wherein the locking mark comprises at least one of: a stroke highlight effect, a skin material with a warning color, a text prompt, and a pattern mark.

15. An electronic device, comprising: a processor, a storage medium, and a bus, wherein the storage medium stores program instructions executable by the processor, wherein when the electronic device is running, the processor and the storage medium communicate via the bus, and the processor executes the program instructions to perform steps of a target locking method, with the target locking method comprising:

determining, by the electronic device, an anchor point position, wherein a graphical user interface is provided by the electronic device, and a plurality of virtual objects are displayed on the graphical user interface;

determining, from the plurality of virtual objects, a plurality of target virtual objects corresponding to a target skill according to a relative position of each virtual object to the anchor point position and the target skill, wherein the target skill comprises a plurality of skills; and displaying a locking mark on a target virtual object, wherein displaying the locking mark on the target virtual object comprises:

displaying the locking mark corresponding to a type of the target virtual object on the target virtual object, according to the type of the target virtual object;

displaying a same locking mark for a same type of target virtual objects corresponding to the plurality of skills, according to types of the target virtual objects;

in response to determining that the target virtual objects corresponding to the plurality of skills comprise different quantities of the virtual objects of the same type, determining a quantity of the skills superimposed on each target virtual object, according to the type of each target virtual object; and displaying a superimposition effect of the locking mark on each target virtual object, according to the quantity of the skills superimposed on each target virtual object.

16. A non-transitory computer-readable storage medium, storing a computer program thereon, wherein the computer program, when executed by a processor, performs steps of a target locking method, with the target locking method comprising:

determining, by a terminal, an anchor point position, wherein a graphical user interface is provided by the terminal, and a plurality of virtual objects are displayed on the graphical user interface;

determining, from the plurality of virtual objects, a plurality of target virtual objects corresponding to a target skill, according to a relative position of each virtual object to the anchor point position and the target skill, wherein the target skill comprises a plurality of skills; and displaying a locking mark on a target virtual object, wherein displaying the locking mark on the target virtual object comprises:

displaying the locking mark corresponding to a type of the target virtual object on the target virtual object, according to the type of the target virtual object;

displaying a same locking mark for a same type of target virtual objects corresponding to the plurality of skills, according to types of the target virtual objects; and in response to determining that the target virtual objects corresponding to the plurality of skills comprise different quantities of the virtual objects of the same type, determining a quantity of the skills superimposed on each target virtual object, according to the type of each target virtual object; and displaying a superimposition effect of the locking mark on each target virtual object, according to the quantity of the skills superimposed on each target virtual object.

* * * * *